US006153038A

United States Patent [19]

Brooker

[11] Patent Number: 6,153,038

[45] Date of Patent: Nov. 28, 2000

[54] METHOD FOR TRANSFERRING AN IMAGE FROM A FIRST MEDIUM TO A SECOND MEDIUM AT AMBIENT TEMPERATURE

[75] Inventor: Dennis B. Brooker, Derby, Iowa

[73] Assignee: 3M Innovative Properties Company, St. Paul, Minn.

[21] Appl. No.: 08/928,896

[22] Filed: Sep. 12, 1997

Related U.S. Application Data

[63] Continuation-in-part of application No. 08/615,503, Mar. 12, 1996, abandoned.

[51] Int. Cl.[7] .......................... B44C 1/165; B32B 31/20; B41M 3/12

[52] U.S. Cl. .......................... 156/230; 156/237; 156/240; 156/289; 427/146; 428/914

[58] Field of Search .................................... 156/230, 237, 156/238, 239, 240, 241, 247, 277, 289; 427/146, 147, 148; 428/195, 914, 915

[56] References Cited

U.S. PATENT DOCUMENTS

| | | | |
|---|---|---|---|
| 3,854,975 | 12/1974 | Brenneman . | |
| 4,258,095 | 3/1981 | Larson . | |
| 4,275,104 | 6/1981 | de Nagybaczon | 428/195 |
| 4,342,614 | 8/1982 | Vanden Bergh . | |
| 4,356,764 | 11/1982 | Haugen . | |
| 4,373,984 | 2/1983 | Hawkins . | |
| 4,380,874 | 4/1983 | Waldron . | |
| 4,595,931 | 6/1986 | Toganoh et al. | 346/1.1 |
| 4,681,034 | 7/1987 | Schulzen . | |
| 4,705,584 | 11/1987 | Lauchenauer | 156/79 |
| 4,758,952 | 7/1988 | Harris, Jr. et al. | 364/300 |
| 4,773,953 | 9/1988 | Hare | 156/240 |
| 4,785,313 | 11/1988 | Higums . | |
| 4,820,559 | 4/1989 | Steelman . | |
| 4,842,613 | 6/1989 | Purser . | |
| 4,891,242 | 1/1990 | Ito et al. | 427/53.1 |
| 4,908,633 | 3/1990 | Ohashi . | |
| 5,023,038 | 6/1991 | Aslam . | |
| 5,236,527 | 8/1993 | Brodsky | 156/85 |
| 5,248,363 | 9/1993 | Hale . | |

(List continued on next page.)

FOREIGN PATENT DOCUMENTS

| | | | |
|---|---|---|---|
| 0535718A2 | 4/1987 | European Pat. Off. . | |
| 0 461 796 A1 | 12/1991 | European Pat. Off. | B41M 3/12 |
| 0509829A1 | 10/1992 | European Pat. Off. . | |
| 0583168A2 | 2/1994 | European Pat. Off. . | |
| 0 649 753 | 4/1995 | European Pat. Off. | B41M 5/03 |
| 0657309A1 | 6/1995 | European Pat. Off. . | |
| 2 407 085 | 6/1979 | France . | |
| 7809199 | 3/1980 | Germany . | |
| 2 289 866 | 12/1995 | United Kingdom | B44C 1/165 |
| WO 95/23705 | 9/1995 | WIPO | B41M 5/00 |
| WO 97/07991 | 3/1997 | WIPO | B44C 1/16 |
| WO 97/33752 | 9/1997 | WIPO | B41F 16/00 |
| WO 97/42040 | 11/1997 | WIPO | B44C 1/165 |

OTHER PUBLICATIONS 4 pages—(copy) Hewlett Packard HP 51636F LX JetSeries Transparency Film, Copyright 1993 by Hewlett Packard, Box Lid and Sides of box.

*Primary Examiner*—Curtis Mayes
*Assistant Examiner*—J. A. Lorengo

[57] ABSTRACT

An application for an improved method of transferring an ink image from one medium to a second medium at ambient temperature is disclosed. A digitized image is selected to be printed on a ink type printer on a computer device. Prior to printing, the image can be manipulated in various way on the computer device. The image is printed onto a non-absorbent medium utilizing the ink type printer. The image is then transferred from the non-absorbent medium to the object on which it is desired to have the image. No excess heat is required for the transfer process. Pressure is applied to the back side of the non-absorbent medium to assist in the image transfer. Prior to transferring the ink image, the surface of the object can be prepared by marring or application of a suitable substrate.

31 Claims, 3 Drawing Sheets

U.S. PATENT DOCUMENTS

| | | | |
|---|---|---|---|
| 5,486,228 | 1/1996 | Miller . | |
| 5,488,907 | 2/1996 | Xu . | |
| 5,497,699 | 3/1996 | Mather . | |
| 5,559,708 | 9/1996 | Turnbull et al. | 364/468.03 |
| 5,582,669 | 12/1996 | Gove et al. | 156/239 |
| 5,587,405 | 12/1996 | Tanaka . | |
| 5,695,588 | 12/1997 | Daems et al. | 156/247 |
| 5,766,398 | 6/1998 | Cahill et al. | 156/240 |

METHOD FOR TRANSFERRING AN IMAGE FROM A FIRST MEDIUM TO A SECOND MEDIUM AT AMBIENT TEMPERATURE

CROSS-REFERENCE TO RELATED APPLICATIONS (CLAIMING BENEFIT UNDER 35 U.S.C. 120)

This application is a continuation-in-part of U.S. application Ser. No. 08/615,503 filed Mar. 12, 1996, now abandoned, by Dennis D. Brooker, which application is incorporated herein by reference.

AUTHORIZATION PURSUANT TO 37 CFR 1.71 (d) (e)

A portion of the disclosure of this patent document, including appendices, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention relates generally to the art of applying printed images to objects and specifically to the use of an ink type printer for transferring a computer image onto a target object at an ambient temperature using an intermediate medium.

2. Background Art

Techniques for printing images and words on objects are numerous and include the processes of letterpress, lithography, gravure and screen printing. In order to determine the appropriate process for a particular job, considerations of quality, quantity, complexity of the reproduction, number of colors, characteristics of the target object or medium, and cost must be evaluated and balanced. Additionally, with the development of high quality, economical printers available for connection to economical multimedia computers, the layperson is capable of creating and printing high quality images and documents which include high resolution color.

Printers to be attached to computers generally are either a laser type printer or an ink type printer. The laser type printers use heat to bond a toner to the surface of the medium, typically paper, passing through the printer. The ink type printers selectively spray the inks onto the medium, again typically paper, passing through the printer. Both types of printers are capable of high resolution in the order of 600–1200 dots per inch or better. Some types of printers, especially laser types, are capable of a resolution which is much higher.

While these types of printers offer tremendous savings over the traditional processes of printing discussed above in terms of economy and time, they have the disadvantages of limiting the type and size of medium which can be passed through the printer. For example, virtually every printer requires that the medium be a relatively flat surface. It would not be possible to feed a baseball through the printer. Additionally, the size of the medium is limited to the size of the printer and the feeding mechanism. Most economical printers are not capable of feeding though a medium much wider than a sheet of legal paper. Also, the medium usually must be flexible due to the fact that many printers do not allow the medium to pass through the printer in a planer fashion. Thus, a piece of card-board may not be a suitable medium because it may be too wide, too thick, or too rigid to pass through the printer. The use of a type of printer known as a plotter may address some of these issues, primarily the width and secondarily the rigidity, but for the most part a plotter is encumbered with the same limitations as the other printers.

In order to print upon a medium which will not pass through a computer printer, one of the other previously mentioned printing processes must be used. The other printing processes also have their own disadvantages which include additional time and cost. This is especially true in the initial stages of the printing process known as the set-up. If the quantity of objects to be printed is sufficiently large, the increased investment of time and resources for set-up may, and most likely will, warrant the use of one of the traditional printing processes. However, if the quantity of objects to be printed is small, the high initial set-up investment may make overall printing cost per object too high.

An additional drawback to the traditional printing processes and the high set-up investment is that it makes it impractical to view how the printed object will look prior to the time when the process is ready for mass production. In other words, the printing processes make it very difficult to make corrections or adjustments after viewing the first printed object because the initial set-up investment already has been made and a significant duplication of that investment would be required to make any changes.

Thus, there is a need for a printing process generally which overcomes the drawbacks of the previously discussed printing process and specifically which is economical even when done in relatively small quantities, which allows for the use of an ink type printer and which allows for printing on a wide variety of media which cannot be passed through a printer.

DISCLOSURE OF THE INVENTION

The present invention relates generally to the art of applying printed images to objects and specifically to the use of an ink type printer for transferring a computer image onto a target object using an intermediate medium. Preferably, the method of transferring requires only ambient temperature and hand pressure. However, in some instances it may be desirable to provide more than hand pressure. But no elevated temperature is required for the use of the present invention. The present invention comprises a process wherein a digitized image is selected on a computer device for printing on an ink-type printer. Preferably, the image is printed with water-based inks and the non-absorbent medium has properties that receive the water-based inks in a precise image pattern. Use of transparency film for laser type printers or other translucent or opaque films having similar compositions provides these properties. The side of the first medium which receives the ink image is the front side. The film is then applied to a second medium and pressure is applied to the back of the first medium such that the ink image is substantially transferred to the second medium.

The pressure used to transfer the ink image from the first medium to the second medium can be accomplished by burnishing, rollers, stamps or any other means of applying pressure which provides for a substantial vertical pressure applied to the back side of the first medium. A high density transferred image can be accomplished by repeating the process one or more times with care being given to precisely overlay the ink images. Preferably, a high density transferred image can be accomplished with one act of transferring if one selects the appropriate non-absorbent medium, the appropriate settings of the computer image, is discussed below.

The second medium can be comprised of virtually any material such as wood, plastic, glass, metal, ceramic, acrylic, vinyl, self-adhesive vinyl, paint, paper, cardboard. The second medium surface must be suitable for receiving the ink image. If the surface of the second medium is not naturally suitable, it may need to be prepared either by marring or by applying an appropriate substrate. The preparation of the surface need only be in the portion of the surface which is to receive the ink image.

After the ink image has been transferred to the second medium, a sealant can, be applied over the transferred image to protect the ink image. Various types of ink can be used in the ink type printer including water soluble ink, non-water soluble ink, high pigment density ink, and ink with sealant.

Sources for images to be selected on the computer include the use of a scanner, the use of a digital camera, downloading an image from a remote source (such as a disk or network), and creating a new image on the computer. Prior to printing the selected computer image, the image can be manipulated. Manipulation of the image can include adjusting brightness, colors, orientation, size, background, foreground, shape and various other visual effects. A variety of image manipulation computer programs are available to those skilled in the art. Among these are Adobe PageMaker, Adobe Photoshop, Adobe Illustrator, 3M Graphic Maker Ink Jet Software (Minnesota Mining and Manufacturing Company (3M)), and many others. The ability to manipulate the image is important to the ability to control the image received by the non-absorbent medium for its transfer on the second medium.

An object of the present invention is to provide an image transferring process which allows for the use of a computer and ink type printer to print and transfer an image onto virtually any surface.

Another object of the present invention is to provide an image transferring process which allows for transferring an image onto a target surface with no temperature elevation during the process.

A further object of the present invention is to provide an image transferring process which allows for transferring an image onto surface which can not be passed through a typical ink type printer.

Another object of the present invention is to provide an image transferring process which allows for preparation of a medium which typically is not a suitable surface for receiving a printed image.

Still another object of the present invention is provide an image transferring process which allows for transferring computer selected images onto virtually any surface in a manner which is fast, effective and economical even when used for printing small quantities.

Other objects, advantages, and novel features of the present invention will become apparent from the following detailed description of the invention when considered in conjunction with the accompanying drawings.

BEST MODES FOR CARRYING OUT THE INVENTION

Figure 1:
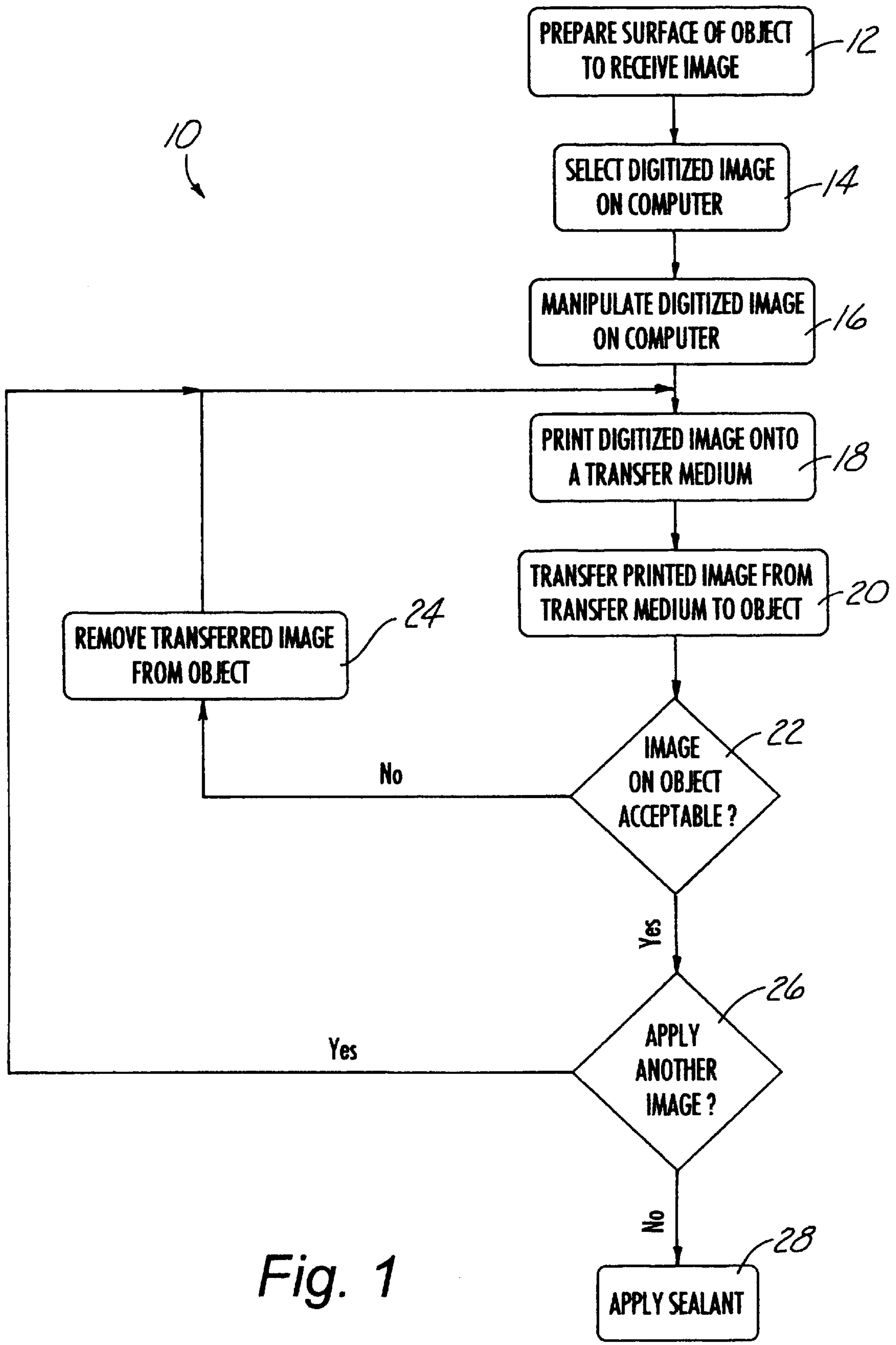
FIG. 1 is a flow chart for a method of image transfer detailing the various steps of the present invention.

To assist in a better understanding of the invention, a description of different forms and embodiments of the invention will now be described in detail. Reference will be made to the accompanying drawings. Reference numbers and letters will be used in the drawings to indicate specific parts and locations on the drawings. The same reference numerals and letters will be used throughout the drawings unless otherwise indicated.

Referring now to FIG. 1, a flow chart diagram of the image transferring method (10) of the present invention is shown. In order to facilitate a better understanding of the image transferring method (10), a general discussion of the process will be discussed followed by a more detailed discussion of the various steps.

The first step of the image transferring method of the present invention is to prepare the surface (12) of the object or item which ultimately is to receive the image. This step (12) may not always be necessary and will be discussed in greater detail below. After preparing the surface (12) of the object to receive a transferred image., if necessary, the image to be transferred must be selected on a computer (14). After the image has been selected on the computer (14), the image is manipulated or modified on the computer (16). The two most common types of image manipulation (16) are reversing the image and adjusting the brightness of the image.

After the image has been manipulated (16) and is in its final form, the image is printed onto a non-absorbent medium (18), such as a film transparency made for use with a laser type printer, hereinafter referred to as "laser transparency film." The printing on the laser transparency film is done, however, utilizing an ink type printer connected to the computer. Using a laser type printer will not work with the present invention. The printer must be of the type which essentially sprays the ink or inks onto the medium passing through the printer.

The laser transparency film is a non-absorbent medium having properties which allow it to relieve the ink image in a precise image pattern. Any translucent or opaque film having similar properties may be used.

The laser transparency film, also known as the transfer medium, includes a front side and a back side. For the sake of discussion, it should be assumed that the ink image is positioned on the front side of the transparency film. Using a non-absorbent medium allows the ink image to remain on the surface of the transfer medium. It may sound unusual and surprising that a laser transparency film is being used in an ink type printer, but despite warnings not to do this on at least the 3M brand of laser transparency films, that is precisely what is being done in this case.

This process will work even if the laser transparency film is made to be opaque. Other smooth non-absorbent mediums (18), besides laser transparency film can also be used. The transparency film made for ink type printers, hereinafter called "ink transparency film" having a solution on one surface cannot be used in this process unless the smooth, back side is used, contrary to the instructions on the transparency package which warns against reversing the transparencies. Reversing the ink transparency film may, however, cause the ink type printer to malfunction and that is why the use of laser transparencies are used as a preferred embodiment.

The transparency film, or transfer medium, with the ink image on the front side is then placed front side down onto the object or item, also called the target object, which is to receive the image. The image is then substantially transferred (20) from the transfer medium to the target object by applying pressure on the back side of the transparency film. The transparency film is then carefully removed from the target object.

The transfer occurs without application of heat. Mere ambient temperature with hand or manual tool pressure is sufficient to transfer the image from the transfer medium to the target object or second medium. Unlike other transfer processes known to those skilled in the art, such as the transfer of images to cloth (especially T-shirts) which require the application of elevated temperatures, the method of present invention avoids the necessity of heated transfer. This provides several advantages to those using the present invention. No excess energy is required for the transfer. No heat is present, allowing transfer with danger of burns to human skin or damage to other items including the second medium or target object which itself can be heat-sensitive. Most importantly, the avoidance of heat removes a complicating factor to the transfer step that makes the method of the present invention more convenient, less costly, safer, and more versatile than methods known in the art that involve or require heated transfer of image. For this reason, the present method is a "cold transfer process" in that it does not require heat to work.

The target object is then inspected to see if the image is satisfactory (22). If the image is not satisfactory, then the image may be removed from the target object (24). Removal of the image typically only requires that the target object be washed with water because most of the inks used in ink type printers are water soluble. If the image is acceptable the image is allowed to dry. If it is determined that another image should be applied (26), the steps of printing the image (18) and transferring the image (20) are repeated. Applying another image is essentially just applying another coat of ink which provides for brighter and more defined colors in the image.

When all of the images have been transferred and dried, a sealant can be applied (28). The type of sealant is dependent upon the type of material used as the target object. The sealant provides a layer of protection as well as providing the opportunity to select various finished looks such as flat, semi-gloss, gloss and satin. At this time, the best known sealant for most plastics is Krylon #1312 spray, also referred to as KAMAR Varnish, available from Krylon Products Group, Specialty Division, of the Sherman Williams Company of Solon, Ohio. Alternatively, rather than applying a sealant, the image can be protected by an adhesive laminate that is clear and protects the image. Commercial sources for such over laminates include Minnesota Mining and Manufacturing Company (3M).

Figure 2:
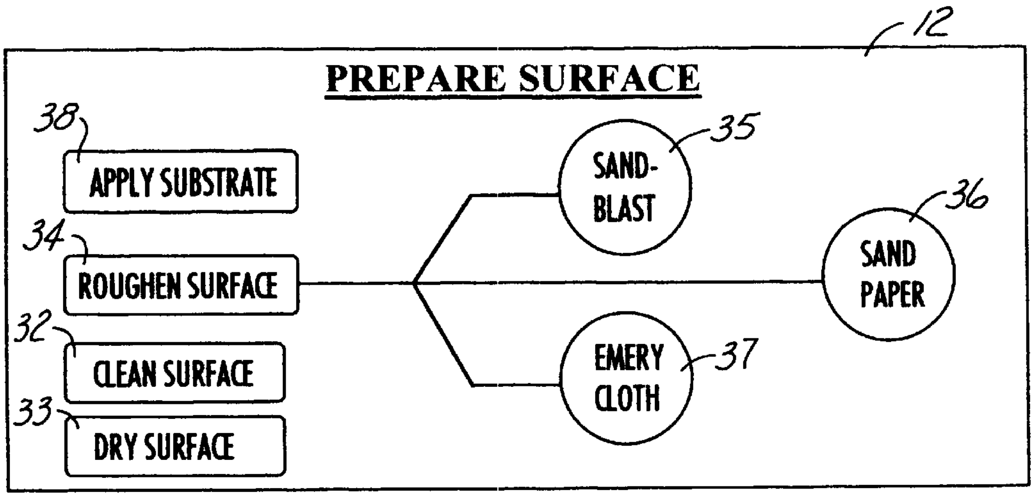
FIG. 2 is a block diagram detailing the steps and methods used in surface preparation.

Referring now to FIG. 2, in order to insure that the target object will properly receive the ink image from the transfer medium, the surface of the target object may need to be prepared. In order to properly receive the ink image, the surface of the target object must either be absorbent, porous, or sufficiently abrasive. All target object surfaces must be clean (32) and dry (33). Whether the surface of the target object needs additional preparation depends upon the type material of which the medium is made.

If the target object, or second medium, is made of a material such as wood, paper, cardboard or another similarly absorbent material, the surface need not be prepared other than to be clean (32) and dry (22). However, if the target object is made of a material such as plastic, glass, acrylic, metal, vinyl, self-adhesive vinyl, or another similarly non-absorbent, smooth material, the surface must be prepared such that it will properly receive the ink image. Obviously, it is only necessary to further prepare the portion of the surface which will actually receive the ink image.

One method of preparing the surface is to roughen or mar the surface (34) of the target object. By roughening or marring the surface of the target object, the surface will become abrasive and will then properly receive the ink image. One method of marring the surface is sand blasting (35). In one method of the present invention, the marring occurs using a 150 grit aluminum oxide in the sand blasting process. The sand blasting process can benefit from construction of a suitable container for the sand blasting, according to methods known in the art. Another method of marring the surface is to use sand paper (36). Still another method of marring the surface is to use an emery cloth or emery board (37). A still further method is burnishing the surface with a rough roller.

Another method of preparing the surface of the target object is to apply a suitable substrate to the surface (38). A suitable substrate is any substrate that will adhere to the surface of the target object and is sufficiently absorbent, porous, or abrasive such that it will properly receive the ink image. In a preferred use of the substrate, the substrate is transparent and provides for a slightly abrasive surface after applied. Another common but excellent substrate is latex paint. Different colors of latex paint can be utilized to add another visual dimension to the transferred image.

Figure 3:
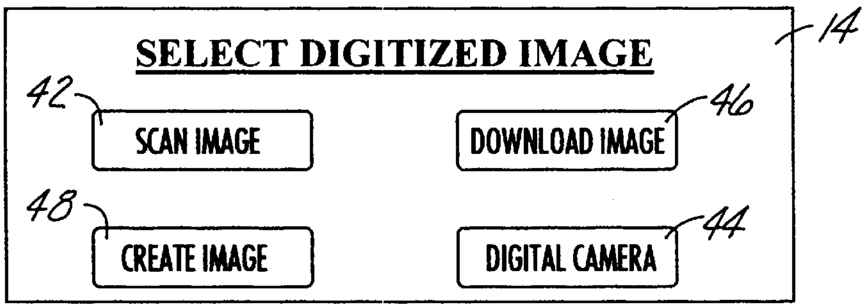
FIG. 3 is a block diagram detailing the various methods of selecting a digitized image.

Referring now to FIG. 3, the various sources of images to be selected (14) are shown. Prior to printing an image, it must either be acquired or created. An image can be acquired from many sources including the use of a scanner (42), the use of a digital camera (44) or by downloading an image (46) from another source such as a disk, hard drive, cd-rom, application program or network. An image can also be created (48) on the computer using any one of the many word processing, graphics, paint, draw programs available or virtually any other program which allows the user the option of printing. These programs are well known to one skilled in the art. When the image is actually selected, it need not necessarily be viewed.

Figure 4:
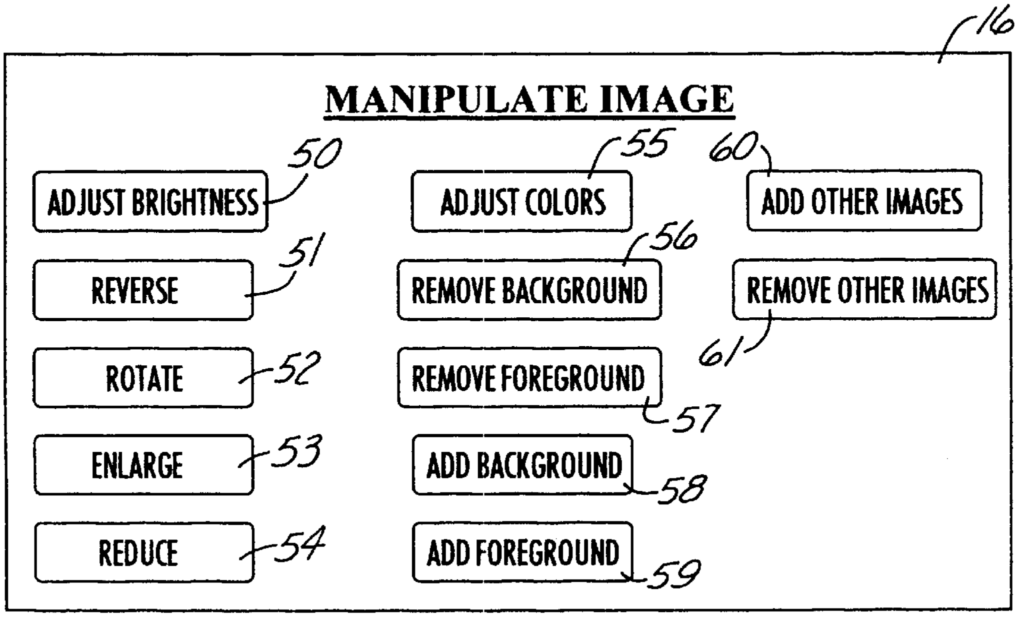
FIG. 4 is a block diagram detailing the various ways in which the digitized image can be manipulated.

Referring now to FIG. 4, the various methods of manipulating an image (16) are shown. Many of the programs discussed above are capable of performing the following manipulations. As discussed above, the two most common manipulations are brightness adjustment (50) and reversal of the image (51). Adjusting the brightness of the image (50) can be done for visual effect but is more often used to lighten the image. By lightening the image, less ink is sprayed onto the transfer medium. If too much ink is used on the transfer medium, the risk of having the image smear as it is transferred onto the target object is increased. It is better to apply two thinner coats of ink than to apply one heavy coat. Reversal of the image (51) is used simply so that the image will be correctly oriented after the image is transferred from the transfer medium to the target object. This is typically necessary when the image to be transferred includes text.

Many other image manipulations can be accomplished and relate solely to the visual aspects of the image. These manipulations include rotating (52), enlarging (53), reducing (54), color adjustment (55), background removal (56), foreground removal (57), background addition (58), foreground addition (59), image addition (60) and image removal (61). Many other visual effects such as stretching, twisting, spiraling and the like can be accomplished with various graphics programs.

During the manipulation of the image, alignment guides can be added outside of the image which can be used to help align images when multiple coats are applied. Alignment guides can be virtually any shape but in a preferred embodiment comprise to small dots on opposite sides of the image.

Figure 5:
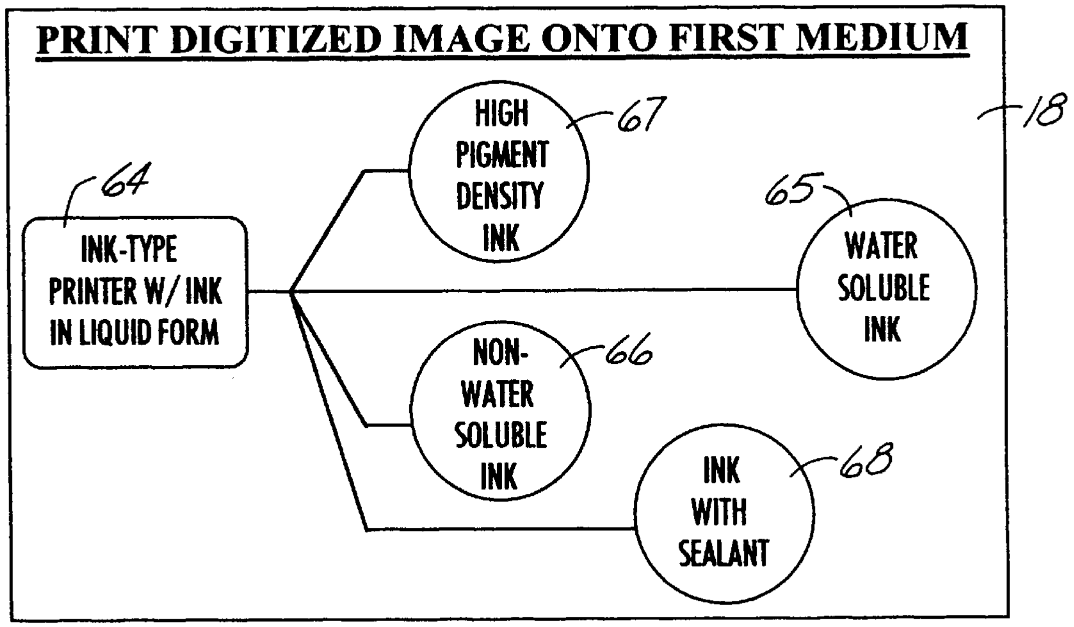
FIG. 5 is a block diagram detailing the various types of ink which can be used in the printer.

Referring now to FIG. 5, a sampling of the various types of inks which can be used in the printing step (18) of the present invention are shown. The printer used in the printing step (18) must be an ink type printer which sprays out the ink such as printers which use Hewlett Packard InkJet Cartridges or Canon BubbleJet Cartridges. As mention previously, the inks used in ink type printers are in liquid form (64) and are water soluble (65). However, two variations on the ink types could be used to help counter the potential for smearing as discussed above. First, a high pigment density ink (67) could be used. This type of ink would allow for brighter colors without the need of applying a heavy coat or multiple coats. Second, ink with a higher viscosity, such as an ink in gel form, would also allow thicker coats to be applied while reducing the likelihood of smearing. Preferably, inks in the ink type printer can be pigmented thermal inkjet inks, pigmented piezo inkjet inks, or dye-based inkjet inks. A number of commercial sources for these inks are known, including Hewlett Packard Corporation, Encad Corporation, Canon Corporation, Minnesota Mining and Manufacturing Company (3M), and others. One advantage of the present invention is ability to use the transfer method of the present invention with a variety of inkjet inks and printheads in a number of ink type printers. For example, one can use the transfer method on desktop inkjet printers or floor mounted printers that print images up to about 50 inches wide. These "large format" printers produce images which also benefit from the transfer without application of heat to a second medium.

Two other types of ink may be used to reduce the need for applying the sealant coat in the final step. First, a non-water soluble ink could be used which is less likely to deteriorate without a protective sealant. Second, an ink with an included sealant (68) could be used. These types of inks would self seal as they dry. It is even possible that these inks could be washed off prior to the time they dry but before becoming permanent after drying. These two types of ink greatly enhance the method of the present invention when the material of the target object is cloth which is difficult to seal.

Figure 6:
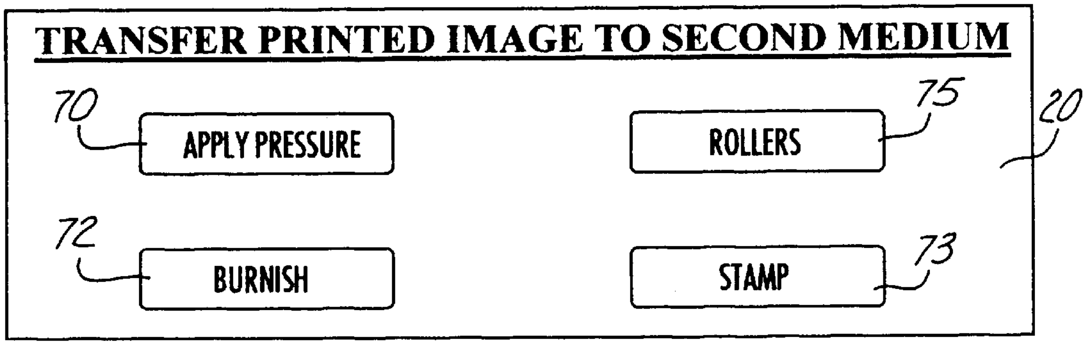
FIG. 6 is a block diagram detailing the various methods of transferring the image to a second medium.

Referring now to FIG. 6, the types of pressure which can be applied during the transfer process (20) are shown. The application of pressure to the back side of the transfer medium greatly assists in the substantial transfer of the image from the transfer medium to the target object, essentially another medium. The important aspect of applying pressure is that it must be substantially vertical or perpendicular to the transfer medium. Applying pressure which tends to slide across the transfer medium will likely cause the ink image to smear. The preferred method of applying pressure (70) is by using a burnishing tool (72). Rollers (75) and stamps (76) can also be used to apply pressure.

As stated previously, the types of pressure used in the transfer process (20) do not require the presence or use of heat. Therefore, the transfer process (20) operates at ambient temperature, usually room temperature. If the transfer process (20) is to occur in outdoor conditions, then one must consider the change in temperature on the ink being transferred and the effect of ambient temperature upon the target object. However, any application of heat to an outdoor target object should not exceed normally room temperatures (less than about 75°–80° F.) because of the advantages to be gained from avoiding elevated heating of the transfer medium or second medium, as discussed above.

With suitable instruction, one can employ a personal computer, an inkjet printer, and the media discussed with respect to this invention to provide a beautiful and precise image on a target object that could not have previously displayed such an image. This invention opens the possibilities of inkjet imaging to many target objects that could not otherwise be imaged with inkjet inks or through ink type printers.

Those using the method of this invention can produce imaged three-dimensional objects, where all three dimensions provide shape to the object. Prior to the present invention, one was limited to the flat three-dimensional sheets of media that could reliably fit through an ink type printer. With the present invention, the transfer process operates on any suitable three-dimensional object that has been prepared as discussed above. Because the types of pressure to be applied during the transfer process (20), the three-dimensional object should not have compound curves that could interfere with the transfer step using pressure. However, a three-dimensional object with flat surfaces and/or simple curves can be imaged using the present invention.

With the absence of heat being required for transfer, the process is safe for use by commercial and personal users of personal computers and ink type printers of various sizes, speeds, production capacities etc.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

I claim:

1. A method of transferring an ink image comprising the steps of:

(a) providing a first medium in sheet form, said first medium having at least one non-absorbent surface;

(b) manipulating a selected image using a computer;

(c) printing the selected image onto said non-absorbent surface of said first medium to form a printed image of said selected image thereon;

(d) transferring said printed image from said non-absorbent surface of said first medium to a second medium to form a second medium having a first image located thereon, wherein said transferring occurs without the application of heat; and (e) repeating steps (c) and (d) with said selected image wherein said selected image, printed and transferred in repeated steps (c) and (d), is transferred onto said second medium at the same location as defined by the first image located thereon.

2. The method of claim 1 including the step of preparing said second medium by marring the portion of the surface of said second medium which is to receive the transferred image.

3. The method of claim 1 including the step of applying a sealer on top of said printed image transferred onto said second medium.

4. The method of claim 1 including the step of applying pressure to said first medium during the step of transferring said printed image to said second medium.

5. The method of claim 1 including the step of using a transparency film as said first medium.

6. The method of claim 1 including the step of preparing the portion of the surface which is to receive the transferred image on said second medium by applying a substrate.

7. The method of claim 1 wherein said step of printing said selected image onto said first medium includes depositing ink from printer capable of printing with ink onto said first medium.

8. The method of claim 7 wherein said ink is deposited onto said first medium without the application of heat.

9. The method of claim 8 wherein said ink is deposited onto said first medium at ambient temperature.

10. The method of claim 8 wherein said ink is deposited onto said first medium at room temperature.

11. The method of claim 7 wherein said ink used in said printer is standard printer ink.

12. The method of claim 1 wherein said second medium comprises an article which is not planer in shape.

13. The method of claim 12 wherein said article includes multiple flat surfaces.

14. The method of claim 12 wherein said article includes surfaces with simple curves.

15. The method of claim 12 wherein said article is of such a shape that said article is incapable of feeding through an ink-type printer.

16. The method of claim 1 including the step of applying an overlaminate on top of said printed image transferred onto said second medium.

17. The method of claim 1, wherein said manipulating comprises adjusting brightness to lighten said selected image.

18. The method of claim 1, wherein said manipulating comprises adjusting brightness to lighten said selected image.

19. The method of claim 1, wherein said manipulating comprises reversing said selected image.

20. The method of claim 1, wherein said manipulating comprises adjusting the color of said selected image.

21. The method of claim 1, wherein said manipulating comprises adjusting the orientation of said selected image.

22. The method of claim 1, wherein said manipulating comprises adjusting the size of said selected image.

23. The method of claim 1, wherein said manipulating comprises adjusting the background of said selected image.

24. The method of claim 1, wherein said manipulating comprises adjusting the foreground of said selected image.

25. The method of claim 1, wherein said manipulating comprises stretching said selected image.

26. The method of claim 1, wherein said manipulating comprises twisting said selected image.

27. The method of claim 1, wherein said manipulating comprises spiraling said selected image.

28. The method of claim 1, wherein said printing comprises printing alignment guides with said selected image.

29. The method of claim 1, wherein said manipulating comprises adding alignment guides to said selected image.

30. The method of claim 1, wherein said manipulating comprises adjusting the orientation of said selected image.

31. The method of claim 1 wherein step (e) is performed using the same said first medium in sheet form used in steps (c) and (d).

* * * * *